United States Patent [19]

Zwernemann

[11] Patent Number: 5,821,472
[45] Date of Patent: Oct. 13, 1998

[54] SUPERSONIC AIRCRAFT EXHAUST NOISE SUPPRESSION SYSTEM

[75] Inventor: Gregory R. Zwernemann, Anaheim Hills, Calif.

[73] Assignee: Northrop Grumman Corporation, Los Angeles, Calif.

[21] Appl. No.: 917,010

[22] Filed: Aug. 21, 1997

Related U.S. Application Data

[63] Continuation of Ser. No. 442,257, May 16, 1995, abandoned.

[51] Int. Cl.$^6$ .............................. F02K 1/08; B64D 33/04
[52] U.S. Cl. .................... 181/215; 181/219; 239/265.13
[58] Field of Search .................................. 181/213, 215, 181/216, 219, 220; 60/262; 239/265.13, 265.17, 265.19

[56] References Cited

U.S. PATENT DOCUMENTS

| | | | |
|---|---|---|---|
| 3,061,038 | 10/1962 | Lawler et al. | 181/215 |
| 3,286,786 | 11/1966 | Wirt . | |
| 3,437,173 | 4/1969 | Ehrich . | |
| 3,587,973 | 6/1971 | Wolf | 181/215 |
| 3,605,939 | 9/1971 | Duthion | 181/215 |
| 3,614,037 | 10/1971 | Vdolek | 239/265.13 |
| 3,710,890 | 1/1973 | True et al. | 181/213 |
| 3,721,314 | 3/1973 | Hoch et al. | 239/265.13 |
| 3,974,987 | 8/1976 | Shorr . | |
| 4,091,892 | 5/1978 | Hehmann et al. . | |
| 4,226,297 | 10/1980 | Cicon . | |
| 4,291,782 | 9/1981 | Klees | 181/215 |
| 4,353,516 | 10/1982 | Soligny et al. | 181/217 |
| 4,509,616 | 4/1985 | Blecherman . | |
| 4,674,716 | 6/1987 | Moore . | |
| 5,154,052 | 10/1992 | Giffin, III et al. | 60/262 |
| 5,167,383 | 12/1992 | Nozaki . | |
| 5,463,866 | 11/1995 | Klees | 60/262 |

*Primary Examiner*—Khanh Dang
*Attorney, Agent, or Firm*—Terry J. Anderson; Karl J. Hoch, Jr.

[57] ABSTRACT

A method of reducing noise from a jet engine at a distance D from the engine comprising the step of up-shifting frequencies of noise from the jet engine to higher frequencies to cause increased noise fall-off in the distance D. Where the jet engine has an exhaust nozzle for exhaust gases carrying the noise of minimum cross-sectional area A, the method comprises, disposing a frequency shifting plate containing a plurality of small openings therethrough of total cross-sectional area A across the exhaust nozzle and passing all exhaust gases from the jet engine through the frequency shifting plate. Each of the plurality of small openings has an individual cross-sectional area which up-shifts frequencies of noise from the jet engine passing therethrough to higher frequencies. Various embodiments of apparatus to perform the method are disclosed.

17 Claims, 12 Drawing Sheets

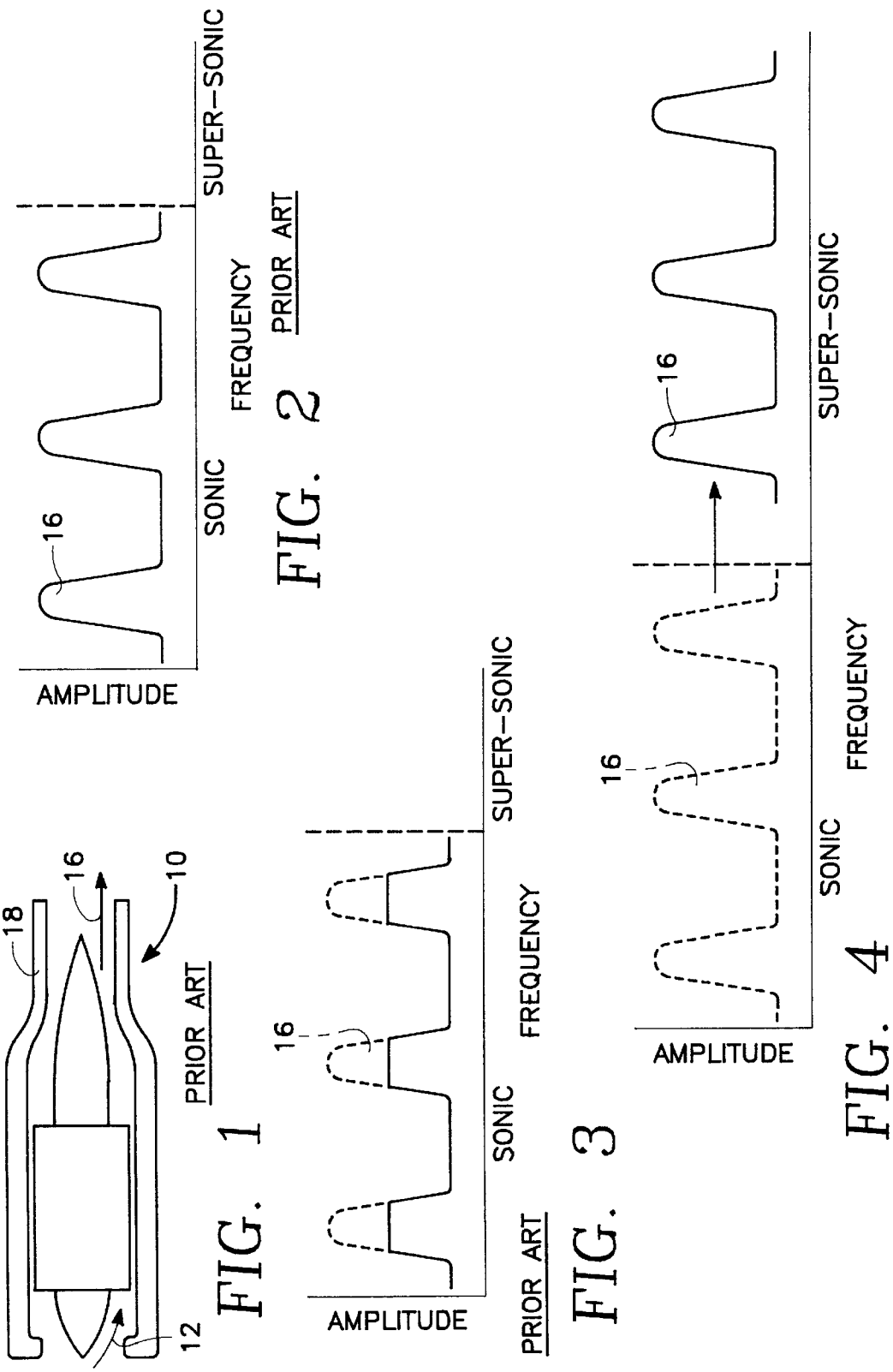

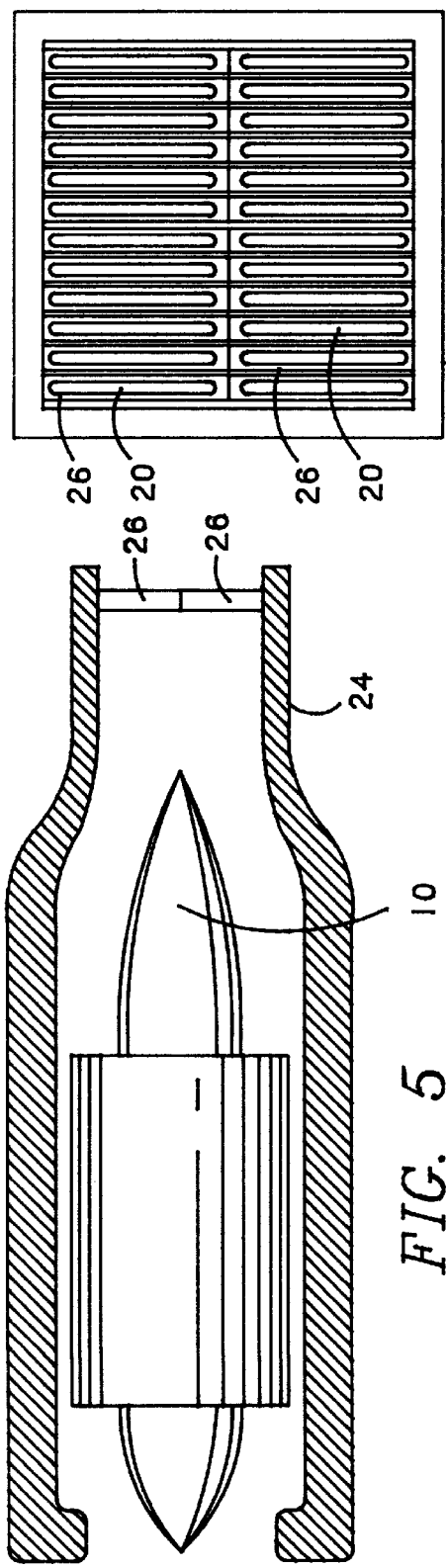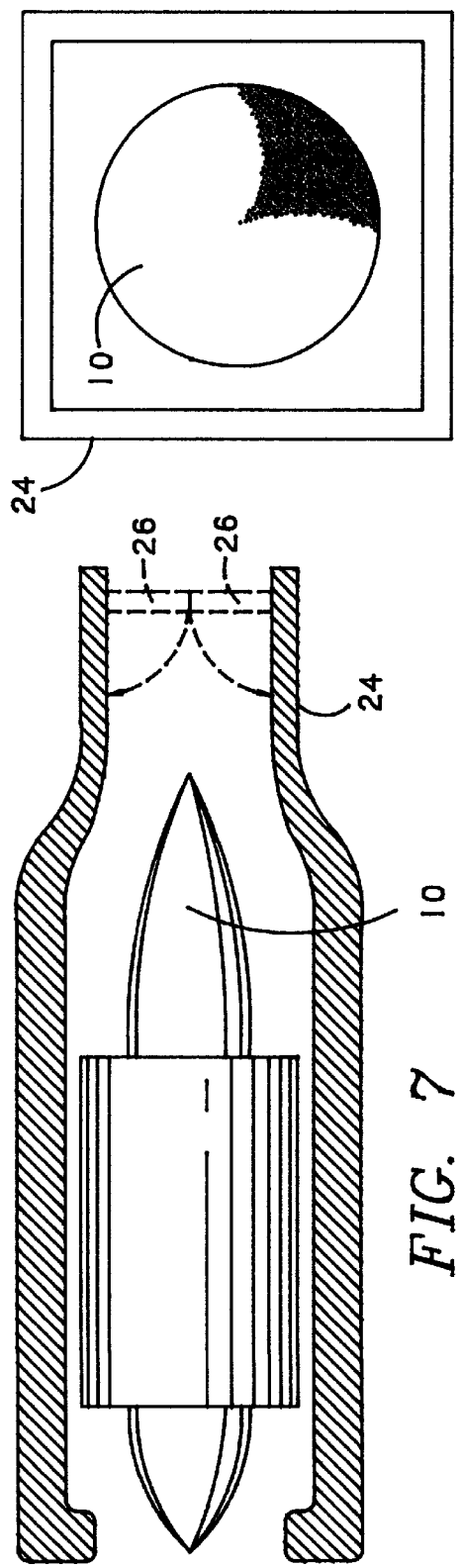

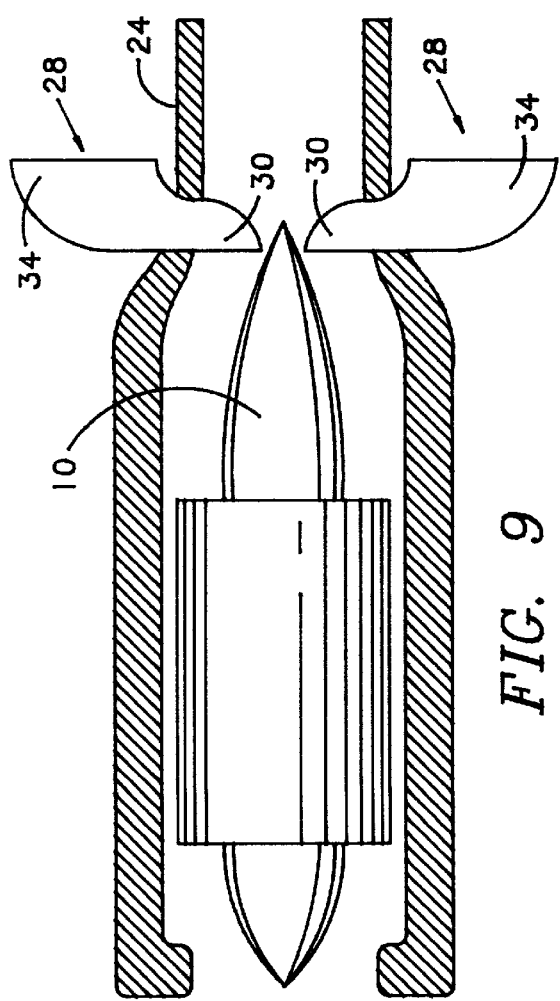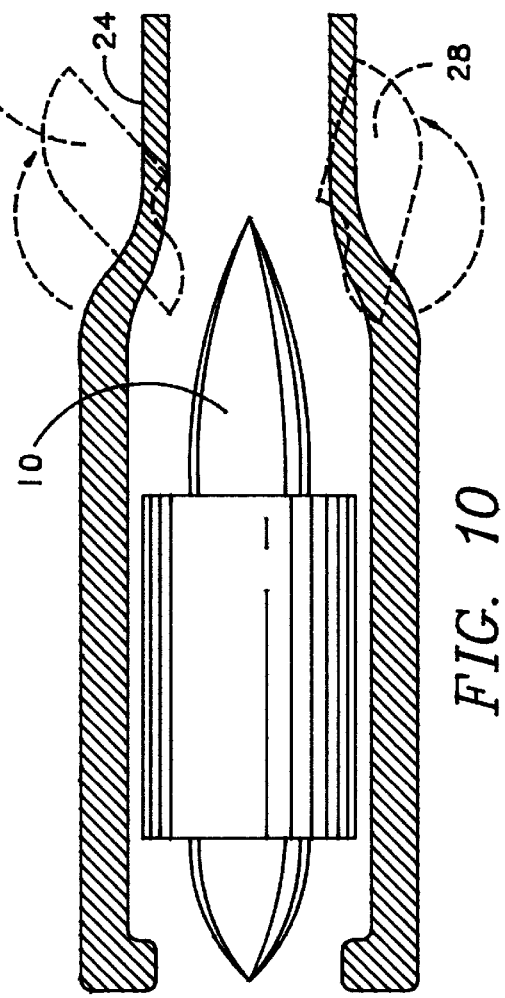

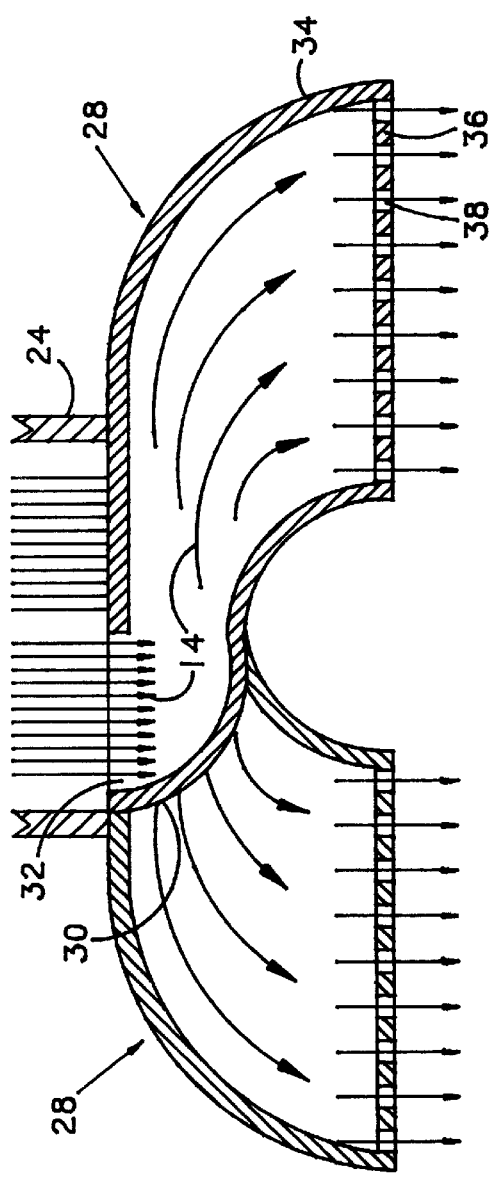
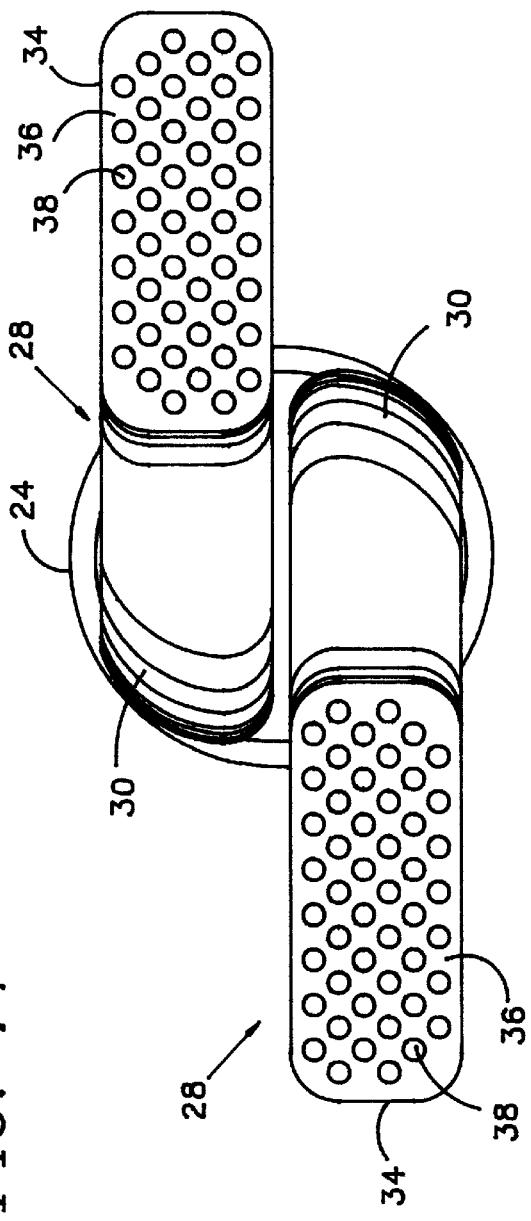

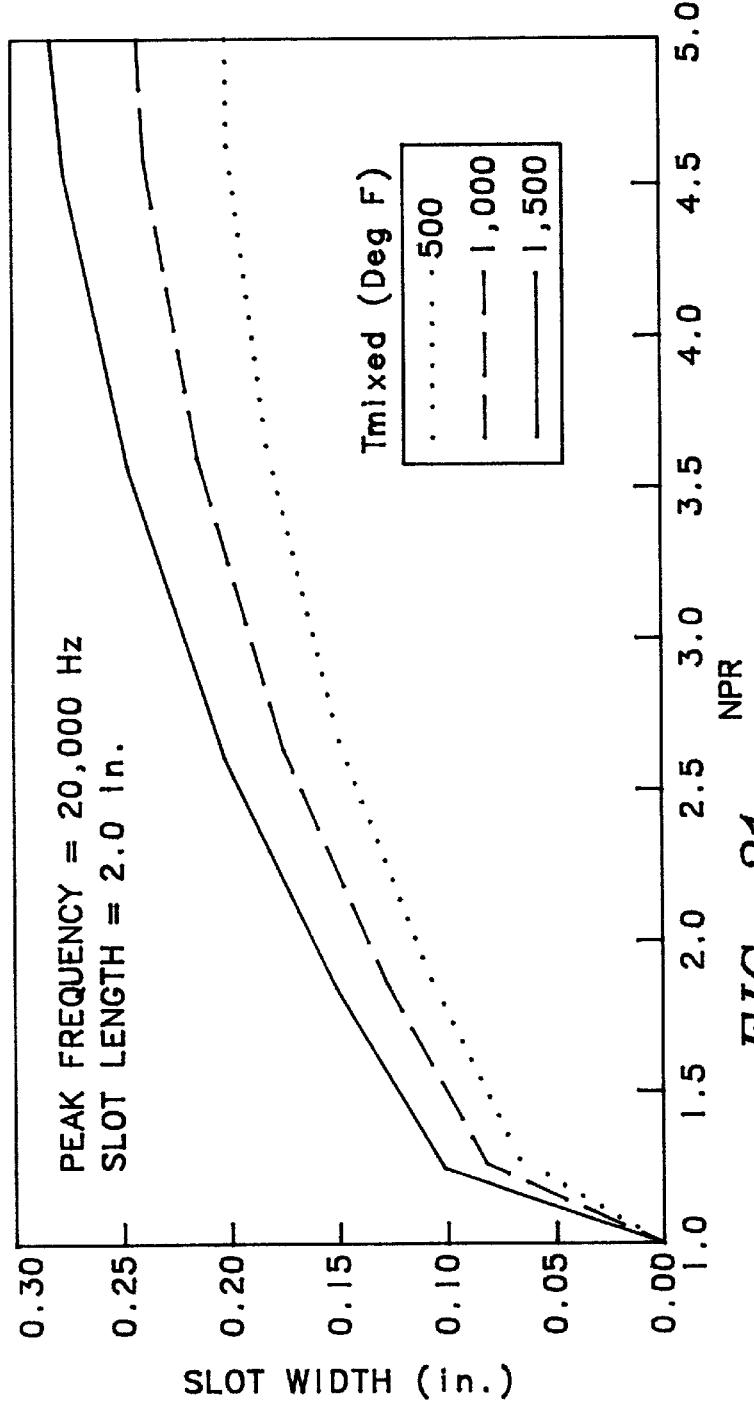
FIG. 21
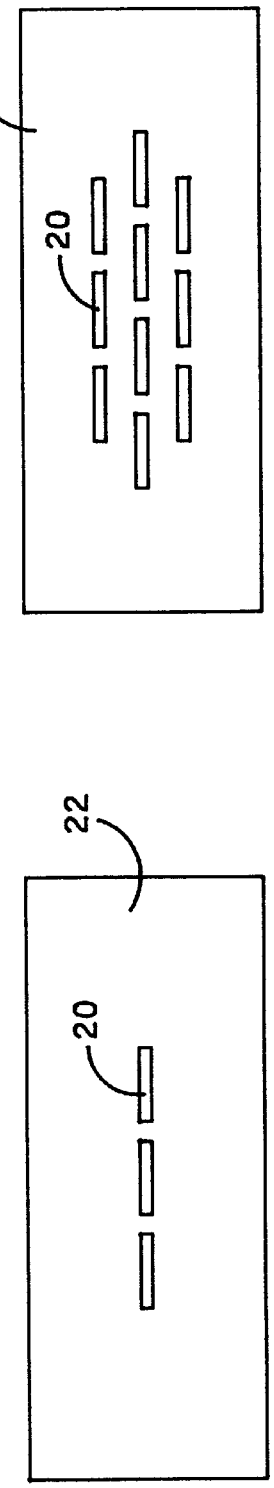
FIG. 23
FIG. 22

SUPERSONIC AIRCRAFT EXHAUST NOISE SUPPRESSION SYSTEM

This is a continuation of application Ser. No. 08/422,257, filed May 16, 1995, now abandoned.

BACKGROUND OF THE INVENTION

1. Technical Field

This invention relates to devices for suppressing engine exhaust noise and, more particularly, to apparatus for reducing noise from a jet engine at a distance D from the engine comprising, frequency shifting means for up-shifting frequencies of noise in exhaust gases from the jet engine to higher frequencies to cause increased noise fall-off in the distance D; and, ducting for conducting at least a portion of the exhaust gases through the frequency shifting means.

2. Background Art

Noise suppression in jet aircraft has been a concern virtually since their inception. This is particularly true with commercial aircraft which, of necessity, must take-off, pass over, and land at or near populated areas. When new airports are built, where possible they are built away from populated areas and in a manner that the take-off and landing patterns avoid causing noise problems. In airport facilities such as San Diego, Calif. where the airport is very near the city, elaborate measures are mandated in an attempt to reduce the noise impact on the urban area. Even Los Angeles, Calif. has restrictions on aircraft performance upon take-off until the immediate urban area has been sufficiently cleared in distance and altitude. Many airports require engines to be throttled back as soon as it is safe to do so and restrict the rate of climb in the immediate vicinity of the airport. Because of its noise levels, the SST Concorde has very restricted access to U.S. airspace and airports.

Over the long term, a high speed (i.e. supersonic) commercial transport aircraft will be needed by the U.S. aircraft industry in order to remain competitive in the world market. In order to be acceptable from a noise perspective, noise suppression will have to be made more acceptable than anything accomplished by the prior art to date.

As depicted in FIG. 1, a jet engine 10 draws in air 12, mixes it with fuel, and burns the mixture to create a high velocity exhaust gas stream 14 which creates the driving force of the engine. As depicted in FIG. 2, the exhaust gas stream 14 covers a wide band of frequencies with peaks 16 at certain frequencies as determined by the velocity of the stream 14 and the shape of, primarily, the exhaust portion 18 of the engine 10.

In the prior art, various techniques were employed to modify those parameters so as to reduce the peaks 16 as depicted in FIG. 3. While internal combustion engines can be virtually silenced using a muffler in the exhaust pipe, building a muffler for a jet engine simply isn't practical for many reasons. The exhaust throughput in a jet engine is far greater because of the increased horsepower and because it is the moving gases which create the force, unlike an internal combustion engine where the moving pistons are pushed by the burning fuel mixture in the confines of the cylinders. And, the throughput of the jet engine cannot be restricted without a corresponding reduction in engine performance. Thus, limited by those restrictions, the prior art has had very limited success with suppressing jet engine noise in supersonic aircraft.

What is needed is a way to shift the noise peaks 16 toward the super-sonic frequency range as depicted in FIG. 4. This would have several benefits. For one, it is the lower frequency "roar" of the jet engine which is the most noticeable and obnoxious. It rattles windows and everything in the house, including the occupants. Elimination of the roar component would be esthetically more acceptable. Also, the higher the frequency, the more rapidly the sound level drops off. Thus, if the frequencies are all made higher, they will drop off in amplitude and strength more quickly. As a consequence, the unacceptable noise "footprint" of the aircraft can be greatly reduced.

Wherefore, it is an object of this invention to provide a way of suppressing super-sonic jet engine noise without restricting air-flow through the engine.

It is another object of this invention to provide a way of suppressing super-sonic jet engine noise by shifting overall frequency content towards higher frequencies.

It is still another object of this invention to provide a way of suppressing super-sonic jet engine noise by reducing the low frequency roar content thereof.

Other objects and benefits of this invention will become apparent from the description which follows hereinafter when read in conjunction with the drawing figures which accompany it.

SUMMARY OF THE DISCLOSURE

The foregoing objects have been attained by the apparatus for reducing noise from a jet engine at a distance D from the engine comprising, frequency shifting means for up-shifting frequencies of noise in exhaust gases from the jet engine to higher frequencies to cause increased noise fall-off in the distance D; and, ducting means for conducting at least a portion of the exhaust gases through the frequency shifting means.

Preferably, the ducting means includes means for selectively not conducting any of the exhaust gases through the frequency shifting means when noise abatement is not required.

In several embodiments, the frequency shifting means and the ducting means comprise a plurality of vane ducts having the frequency shifting means on outlet ends thereof.

In one embodiment, the plurality of vane ducts are radially disposed in an exhaust nozzle of the jet engine.

Preferably, in any embodiment employing same the plurality of vane ducts are movable between a noise abating position with input ends of the vane ducts receiving portions of the exhaust gases and a non-noise abating position with the input ends out of a path of the exhaust gases and receiving no portion thereof.

In one non-preferred embodiment, the jet engine has an exhaust nozzle for exhaust gases carrying the noise of minimum cross-sectional area A and the frequency shifting means comprises a frequency shifting plate containing a plurality of small openings therethrough of total cross-sectional area A across the exhaust nozzle, each of the plurality of small openings having an individual cross-sectional area which up-shifts frequencies of noise from the jet engine passing therethrough to higher frequencies.

In a second non-preferred embodiment, the jet engine has an exhaust nozzle of minimum cross-sectional area A for exhaust gases carrying the noise, the frequency shifting means comprises a plurality of frequency shifting plates containing a plurality of small openings therethrough external to the exhaust nozzle, each of the plurality of small openings having an individual cross-sectional area which up-shifts frequencies of noise from the jet engine passing therethrough to higher frequencies; and, there are a plurality of ducts ducting a plurality of portions of exhaust gases from the jet engine through respective ones of the plurality of frequency shifting plates.

In the preferred embodiment, the jet engine has an exhaust nozzle of minimum cross-sectional area A for exhaust gases of volume V per unit of time carrying the noise and there are, a plurality of frequency shifting plates containing a plurality of small openings therethrough disposed external to the exhaust nozzle, each of the plurality of small openings having an individual cross-sectional area which up-shifts frequencies of noise from the jet engine passing therethrough to higher frequencies; a plurality of mixing nozzles disposed within the exhaust nozzle; a plurality of first ducts ducting a plurality of portions of exhaust gases from the jet engine comprising a volume V/n through respective ones of the plurality of frequency shifting plates, where n can be any number greater than zero; and, a plurality of second ducts ducting ambient air from outside the jet engine comprising a volume V/n through respective ones of the plurality of mixing nozzles.

In all three embodiments, the plurality of small openings may comprise a plurality of narrow slots, a plurality of round bores, or a plurality of nozzles.

In the preferred embodiment, additionally, the plurality of frequency shifting plates are movable between a noise abating position and a non-noise abating position; the plurality of mixing nozzles are movable between a noise abating position disposed within the exhaust nozzle and a non-noise abating position not disposed within the exhaust nozzle; the plurality of first ducts does not duct exhaust gases from the jet engine through respective ones of the plurality of frequency shifting plates when the plurality of frequency shifting plates is in the non-noise abating position; and, the plurality of second ducts does not duct ambient air from outside the jet engine through respective ones of the plurality of mixing nozzles when the plurality of mixing nozzles is in the non-noise abating position.

BRIEF DESCRIPTION OF THE DRAWINGS

FIG. 1 is a simplified longitudinal cross section of a prior art jet engine.

FIG. 2 is a simplified graph depicting how the jet engine of FIG. 1 produces exhaust noise which peaks at certain frequencies within the audible range.

FIG. 3 is a simplified graph depicting how the prior art abates noise as in FIG. 2 by attempting to clip or reduce the specific noise peaks.

FIG. 4 is a simplified graph depicting in general how the present invention abates noise as in FIG. 2 by shifting the noise peak frequencies to frequencies more close to supersonic where they are either not heard at all or have a much reduced audible carrying distance.

FIG. 5 is a simplified longitudinal cross section of a jet engine having exhaust frequency shifting apparatus according to the present invention in a first embodiment depicted in its deployed position.

FIG. 6 is an exhaust end view of the jet engine of FIG. 5.

FIG. 7 is a simplified longitudinal cross section of a jet engine having exhaust frequency shifting apparatus according to the present invention in its first embodiment depicted in its stored position.

FIG. 8 is an exhaust end view of the jet engine of FIG. 7.

FIG. 9 is a simplified longitudinal cross section of a jet engine having exhaust frequency shifting apparatus according to the present invention in a second embodiment depicted in its deployed position.

FIG. 10 is a simplified longitudinal cross section of a jet engine having exhaust frequency shifting apparatus according to the present invention in its second embodiment depicted in its stored position and showing ghosted how the apparatus rotates between the deployed and stored positions.

FIG. 14 is an enlarged, detailed cutaway view through the vanes of the second embodiment in a version wherein a pair of vanes are positioned 180° with respect to each other.

In FIG. 15 is an enlarged, detailed exhaust-end view of the second embodiment of FIG. 14 with the vanes deployed.

FIG. 21 is a graph showing the effects of slot width on peak frequency for different temperatures of exhaust gases.

FIG. 22 is a simplified drawing of one slot configuration employed in a test bed of the present invention.

FIG. 23 is a simplified drawing of another slot configuration employed in a test bed of the present invention.

DETAILED DESCRIPTION OF THE PREFERRED EMBODIMENT

Figure 17:
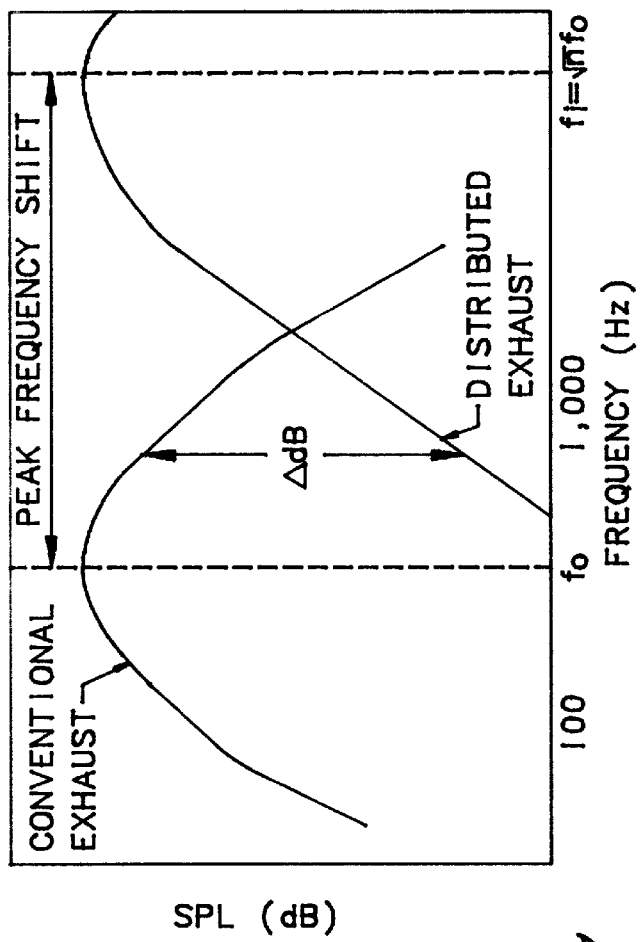
FIG. 17 is a more detailed graph comparing the frequencies of a conventional jet engine exhaust to those of a jet engine having noise abatement apparatus according to the present invention.
Figure 18:
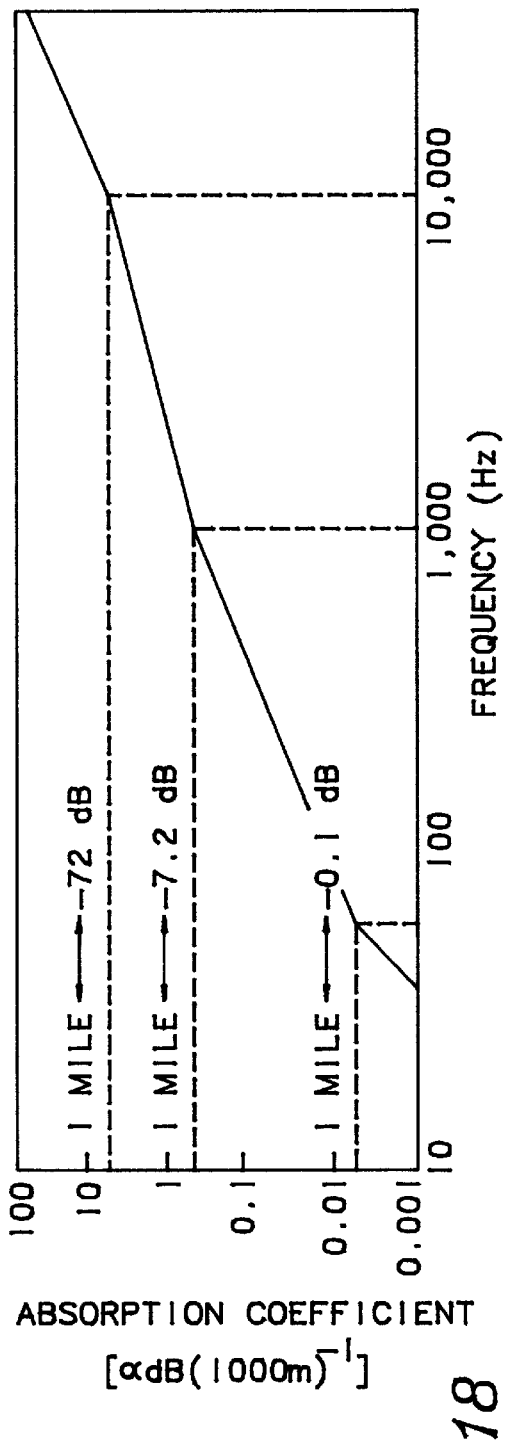
FIG. 18 is a detailed graph depicting how shifting the exhaust frequency causes noise levels to drop off more rapidly with distance from the source.

The present invention is based on achieving the principles shown in FIGS. 17 and 18. As depicted in FIG. 17, the peak frequency of the conventional jet exhaust is shifted much higher by the distributed exhaust approach of the present invention as described hereinafter. As shown more dramatically in FIG. 18, this frequency shift has a dramatic effect on the sound level. At a frequency of 1,000 Hz, the sound drops off only 7.2 dB per mile. By shifting the frequency to 10,000 Hz, the sound drops off 72 dB per mile.

Figure 20:
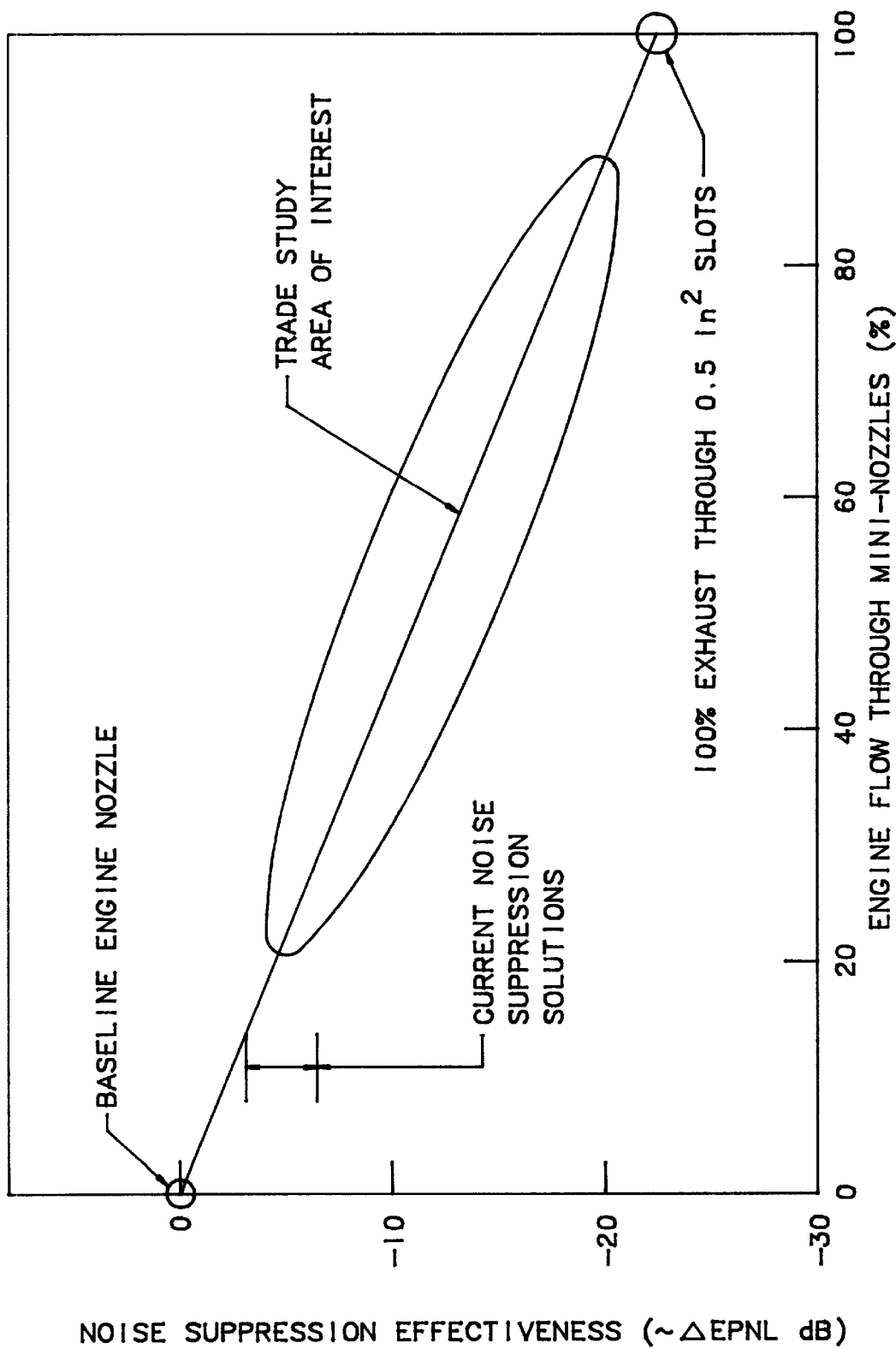
FIG. 20 is a detailed graph depicting how passing the exhaust gases through slots affects noise suppression.

As depicted in FIG. 20, prior art noise suppression solutions working with shapes can effect a 4–7 dB reduction in noise levels at the source. One of the techniques employed in the present invention is to pass the exhaust gases through a plurality of small holes or slots having a total area equal to the original exhaust area of the engine. The holes/slots have the effect of shifting the frequency higher in the manner of a so-called "silent" dog whistle. The use of 0.5 square inch slots in the testbed results depicted in FIG. 20 resulted in over a 20 dB noise suppression. FIG. 21 depicts the effect of different slot widths on different temperature exhausts for a fixed slot length.

FIGS. 22 and 23 depict two different slot arrangements employed in the test bed. In each case, the total area to be created is "A". Thus, the three slots 20 in the cover plate 22 of FIG. 22 are each A/3 in area while the ten slots 20 in FIG. 23 are each A/10 in area. The same approach would be true for nozzles or holes substituted for the slots when implementing the present invention. Having thus described one of the principles employed in the present invention, we will now address possible implementing structures according to the present invention in non-preferred embodiments and a preferred embodiment.

FIGS. 5–8 depict a first embodiment of the present invention as suitable for a square or rectangular exhaust duct 24. A plurality of slots 20 are contained in a pair of plates 26 which are movable between a deployed position as shown in FIGS. 5 and 6 and a stored position as shown in FIGS. 7 and 8. The slots 20 could, of course, be replaced by nozzle openings or holes in the plates 26. The plates 26 could also be different in number and of different shape so as to fit a different shaped exhaust duct 24. The only criteria is that the slots be sufficiently narrow as in the graphed examples described above so as to shift the frequency of the exhaust gas stream 14 an amount which will attain the desired sound suppression; and, their total area must substantially equal the exhaust area of the jet engine leading to the duct 24 so as to not restrict the exhaust flow.

A second embodiment of the present invention is depicted in FIGS. 9–12. In this embodiment, there are a plurality of scoop vanes 28 positioned in the exhaust duct 24. As with the plates 26 of the first embodiment, the scoop vanes 28 can be moved between a deployed position as depicted in FIG. 9 and a stored position as depicted in FIG. 10. In the deployed position, there is an internal scoop portion 30 within the duct 24 which scoops up a portion of the exhaust gas stream 14 through the opening 32. The scoop vanes 28 are hollow and smoothly direct the gas stream portion 14' to an external exhaust portion 34 having an aft-facing covering plate 36 containing a plurality of holes 38 therethrough according to the above-described principles of the present invention. The holes 38 could, of course, be replaced with nozzles or slots as mentioned earlier.

Figures 11, 12, 13:
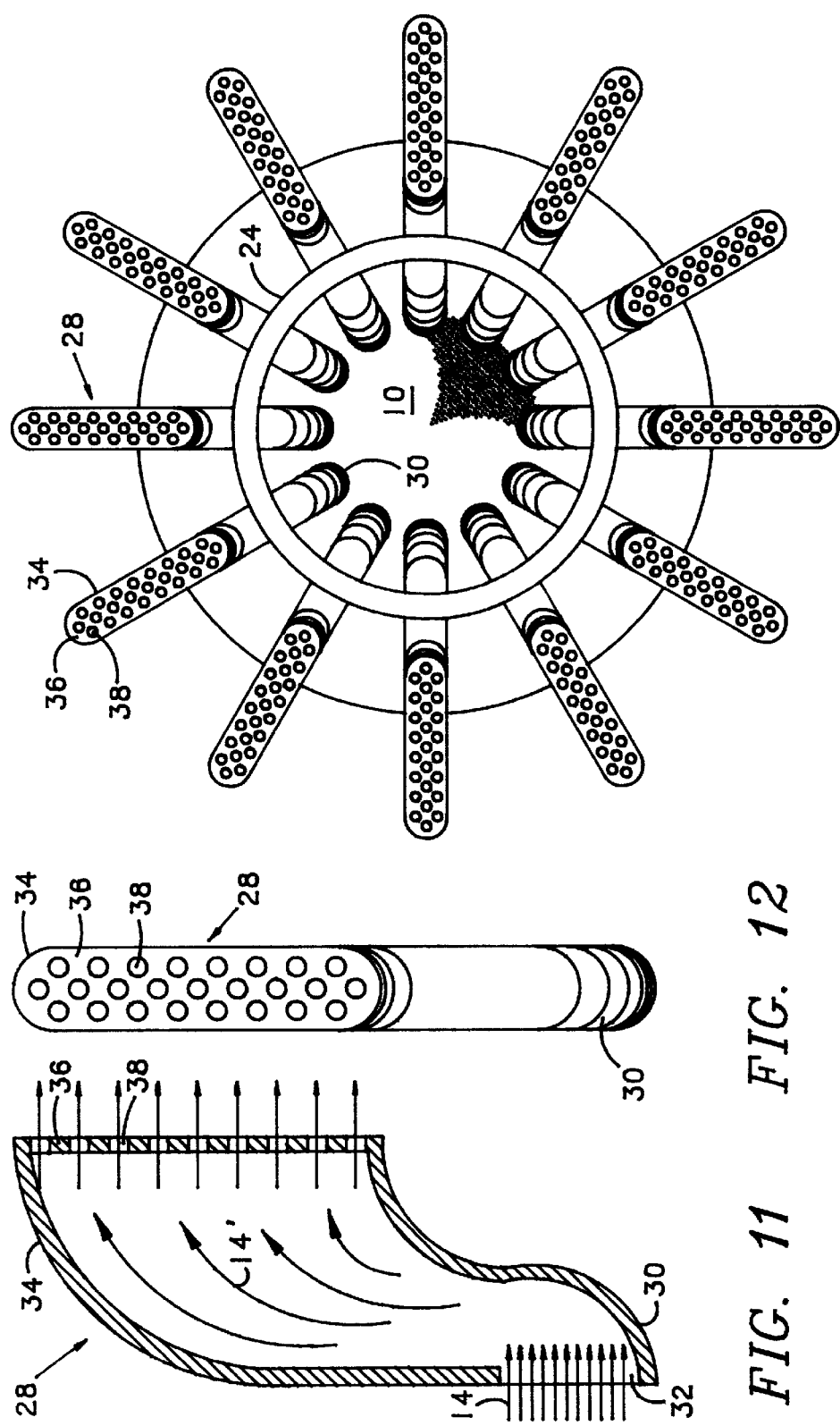
FIG. 11 is an enlarged, detailed cutaway view through one of the vanes of the second embodiment in a version wherein a plurality of vanes are positioned at radially equal distances.
FIG. 12 is an enlarged, detailed exhaust-end view of one of the vanes of the second embodiment of FIG. 11.
FIG. 13 is an enlarged, detailed exhaust-end view of the second embodiment of FIG. 11.

A first version of the second embodiment is shown in FIG. 13. In this version, the exhaust duct 24 is cylindrical and the scoop vanes 28 are equally radially positioned around the exhaust duct 24. In this version, a part of the exhaust gases stream 14 is channeled through the scoop vanes 28 and the remainder exits the exhaust duct 24 in the normal manner; but, with the velocity slowed somewhat and some turbulence being introduced—which also causes sound reduction.

Figure 16:
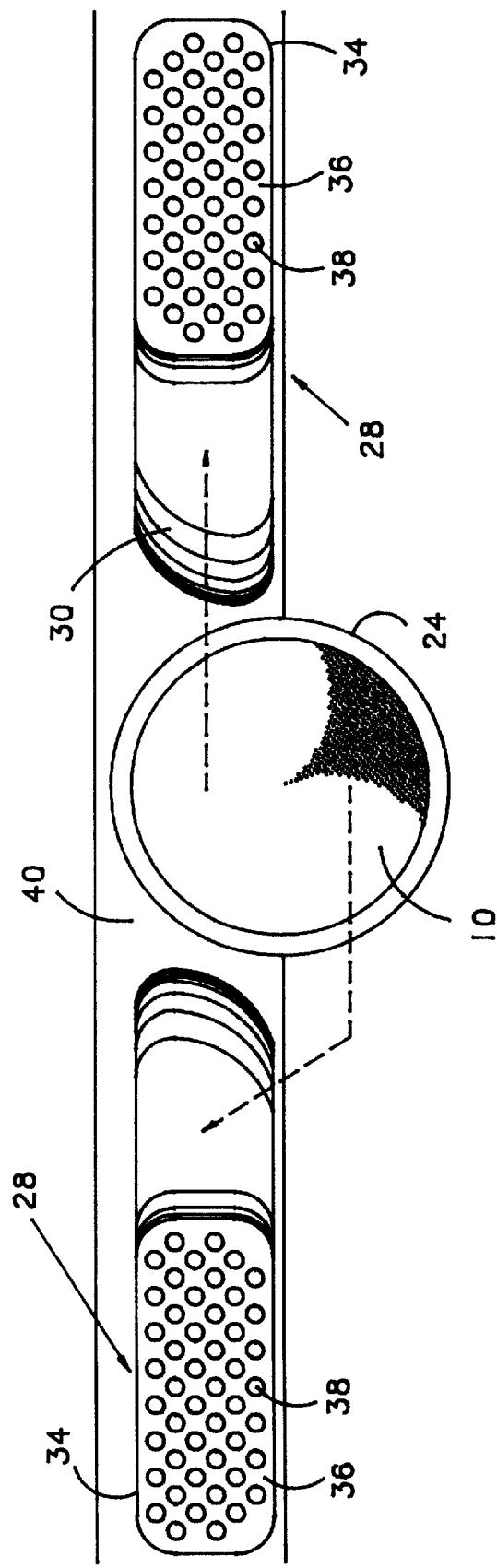
FIG. 16 is an enlarged, detailed exhaust-end view of the second embodiment of FIG. 14 depicting how the vanes can be moved from their deployed position to a stored position along the trailing edge of the wing.

A second version of the second embodiment is shown in FIGS. 14–15. This version is intended for mounting on the trailing edge of the wing and employs two scoop vanes 28 which cover the opening of the exhaust duct 24 when deployed as in FIGS. 14 and 15 and which are stored away from the duct 24 along the wing trailing edge 40 as in FIG. 16.

Figure 19:
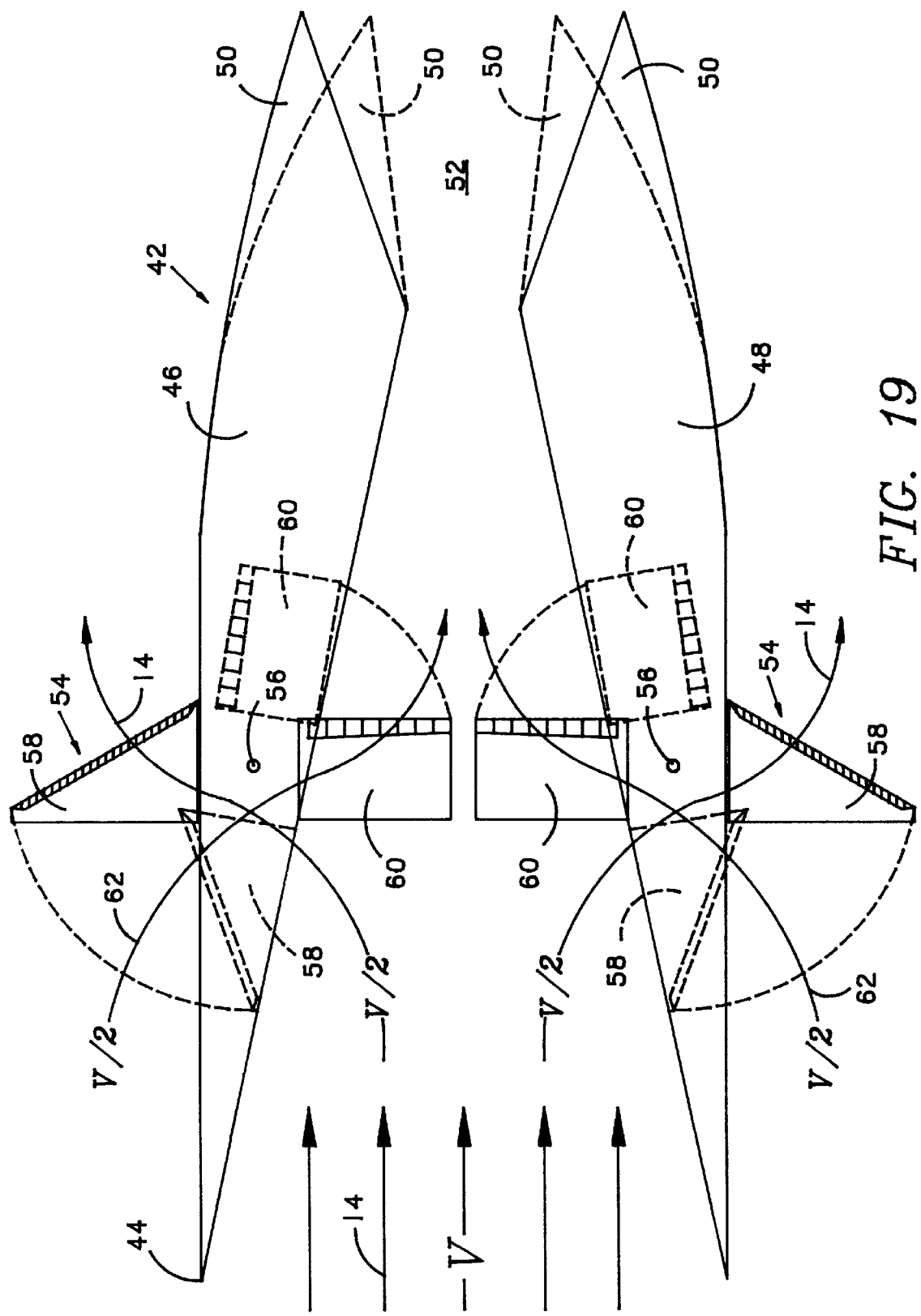
FIG. 19 is a simplified cross section through a third and preferred embodiment of the present invention.

The preferred embodiment of the present invention is depicted in FIG. 19 in simplified form as contained in an exhaust nacelle 42 which is connected to one or more exhaust ducts 24 at 44. The nacelle 42 is rectangular in cross section and comprises mirror upper and lower portions 46 and 48, respectively. Preferably, the trailing portion 50 of both portions 46, 48 is adjustable as shown ghosted in FIG. 19 so that the exhaust opening 52 can be opened and closed for differing conditions.

Each portion 46, 48 includes a pivotable strut assembly 54 which is pivoted about a pivot point 56 between the deployed position as shown in FIG. 19 and its stored position as shown ghosted in the same drawing. Each strut assembly 54 comprises a plurality of external strut/mixers 58 and internal mixers 60. This will be addressed in greater detail after the operation in general is described. Both the external strut/mixers 58 and the internal mixers 60 are hollow and connected on inlet ends to inlet ducts. The external strut/mixers 58 have frequency-shifting slots at their exit ends and the internal mixers 60 have mixers at their exit ends as will all be described shortly. A volume "V" of exhaust gases 14 enters the nacelle 42. Approximately half the volume of exhaust gases 14 is ducted to exit through the external strut/mixers 58. At the same time, approximately half the volume of exhaust gases 14 is replaced with outside air 62 which is ducted to exit through the internal mixers 60. Thus, in the preferred embodiment of the present invention, the volume exiting through the exhaust opening 52 is not changed; but, the temperature thereof is substantially lowered because of the extremely low temperature of high-altitude air, which causes a reduction in sound level as represented by the graph of FIG. 21. At the same time, the internal mixers 60 slow the velocity of the exhaust gases by injecting slow-moving outside air 62 in a state of turbulence, which also causes a reduction in sound level according to known principles. Simultaneously, that portion of the exhaust gas stream 14 exiting through the external strut/mixers 58 is shifted in frequency by the exit slots 20, which as a sound suppressing effect as already discussed. The result is a "distributed exhaust" as mentioned in conjunction with FIG. 17 previously. Not only is the sound energy shifted; but additionally, it is shifted in different amounts to form multiple components each having an intensity substantially lower than the original single component.

The details of the external strut/mixers 58, the internal mixers 60, and their ducting is shown in greater detail in FIGS. 24–28. The exact manner of shifting the components from their deployed to stored positions and the motive power therefor are not covered since such mechanisms are well known to those of ordinary skill in the art and will vary from aircraft structure to aircraft structure.

Figure 25:
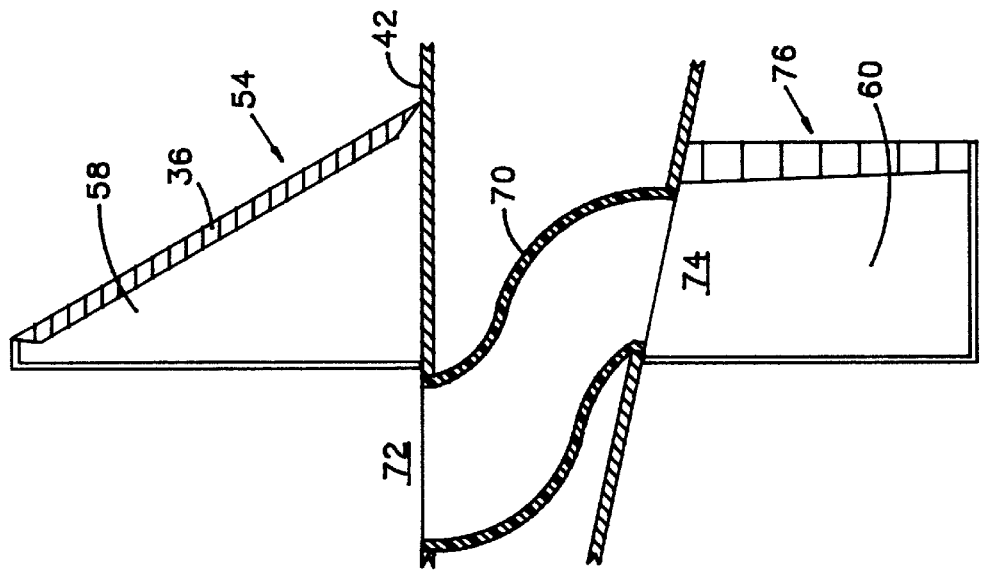
FIG. 25 is a simplified cutaway sideview drawing through the apparatus of FIG. 19 in the area of one external strut/mixer and internal mixer pair showing how the internal mixer is connected by a duct to receive a portion of the outside air and emit it through mixing openings to mix with and cause turbulence in the exhaust gas stream.
Figure 24:
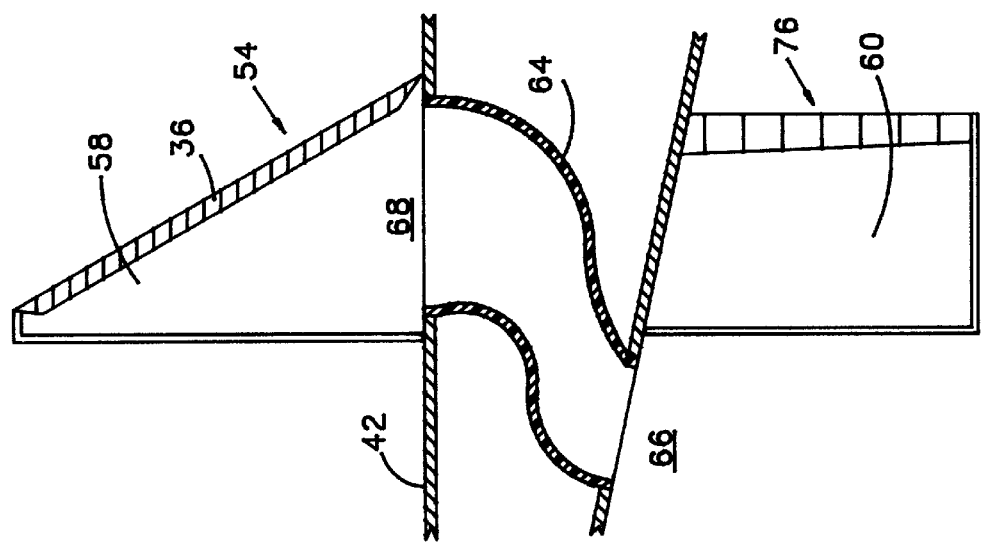
FIG. 24 is a simplified cutaway sideview drawing through the apparatus of FIG. 19 in the area of one external strut/mixer and internal mixer pair showing how the external strut/mixer is connected by a duct to receive a portion of the exhaust gases and emit them through the small openings.

As depicted in FIG. 24, a duct 64 connects the inside 66 of the nacelle 42 to the inlet opening 68 of each external strut/mixer 58. As depicted in FIG. 25, a duct 70 connects the outside 72 of the nacelle 42 to the inlet opening 74 of each internal mixer 60.

Figure 28:
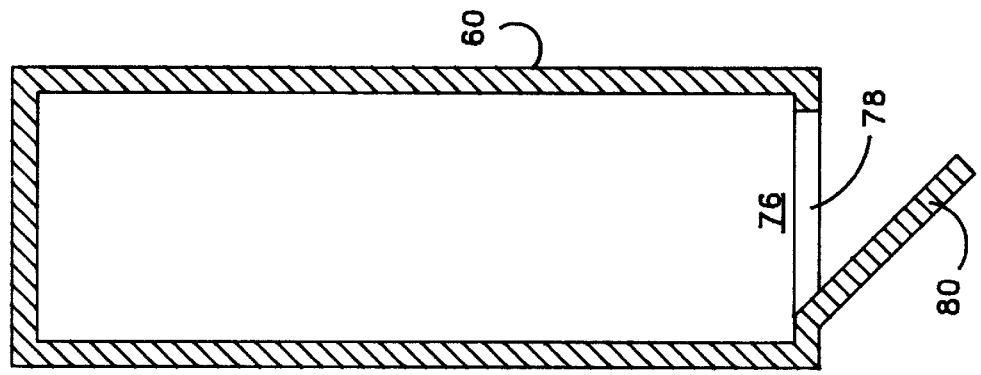
FIG. 28 is a greatly enlarged cutaway view through the internal mixer of FIG. 27 in the plane XXVIII—XXVIII.
Figure 27:
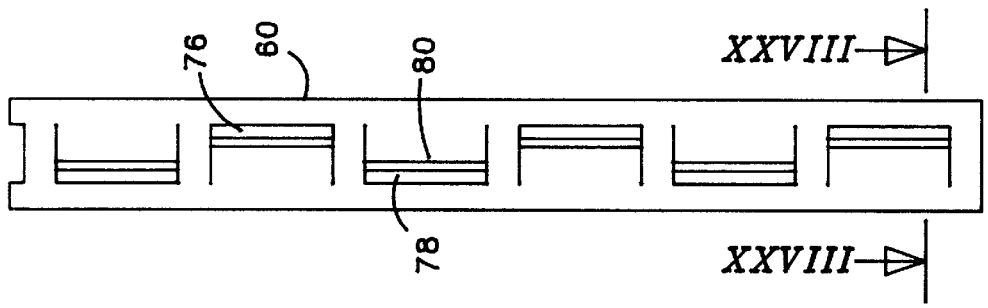
FIG. 27 is an enlarged rear view of one of the internal mixers.
Figure 26:
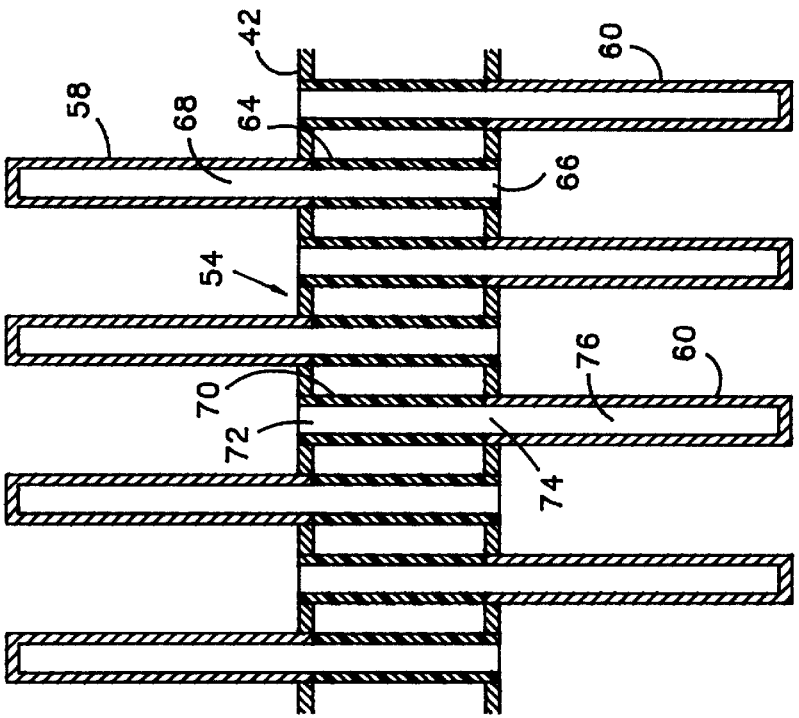
FIG. 26 is a simplified cutaway drawing through the apparatus of FIG. 19 through four external strut/mixers and four internal mixers showing how the external strut/mixers are connected by separate ducts to receive and emit a portion of the exhaust gases and how the internal mixers are connected by ducts to receive and emit a portion of the outside air into the exhaust gas stream.

Each external strut/mixer 58 has a covering plate 36 with slots 20 or holes 38 as described above according to the principles of the present inventions. Each internal mixer 60 has an outlet 76 as depicted in FIGS. 27 and 28. The outlet 76 comprises a plurality of openings 78 covered by alternating tabs 80 at an angle of between 30° and 60°. The air 62 exiting through the openings 78 strikes the tabs 80 and is both slowed and deflected to create turbulence as mentioned earlier herein.

Wherefore, having thus described the present invention, what is claimed is:

1. Apparatus for reducing noise from a jet engine comprising:
    a) a frequency shifting apparatus capable of shifting frequencies of noise contained within a first portion of exhaust gases produced by the jet engine to higher frequencies to cause increased noise fall-off whenever the frequency shifting apparatus is in operation; and,
    b) a mixer capable of mixing ambient air with a second, remaining portion of the exhaust gases produced by the jet engine simultaneously with the operation of the frequency shifting apparatus.

2. The jet engine noise reducing apparatus of claim 1 further comprising:
    a blocking apparatus for preventing conduction of said exhaust gases from the jet engine through said frequency shifting apparatus whenever the frequency shifting apparatus is not in operation.

3. The jet noise reducing apparatus of claim 1, further comprising:
    a) a first ducting mechanism capable of conducting said first portion of the exhaust gases from the interior of the jet engine to the frequency shifting apparatus whenever the frequency shifting apparatus is in operation; and
    b) a second ducting mechanism capable of conducting ambient air into the interior of the jet engine to the mixer whenever the frequency shifting apparatus is in operation.

4. The jet engine noise reducing apparatus of claim 1 wherein said frequency shifting apparatus is capable of being disposed in one of
    (i) a noise abating position wherein the noise contained within said first portion of exhaust gases from the engine is shifted to a higher frequency, and
    (ii) a non-noise abating position wherein the noise contained within said first portion of exhaust gases is prevented from being shifted to a higher frequency.

5. The jet engine noise reducing apparatus of claim 4 herein said mixer is capable of being disposed in one of
    (i) a noise abating position where ambient air is mixed with said second, remaining portion of the exhaust gases, and
    (ii) a non-noise abating position wherein ambient air is prevented from being mixed with said second, remaining portion of exhaust gases.

6. The jet engine noise reducing apparatus of claim 3, wherein the jet engine has an exhaust nozzle of minimum cross-sectional area A for exhaust gases carrying the noise, and wherein:
    a) the mixer comprises a plurality of mixing nozzles disposed within the exhaust nozzle, said mixing nozzles causing the ambient air to mix with said second, remaining portion of the exhaust gases; and
    b) the second ducting mechanism comprises a plurality of second ducts interfaceable with respective ones of said plurality of mixing nozzles whenever the frequency shifting apparatus is in operation, said plurality of second ducts ducting ambient air from outside the jet engine to said plurality of mixing nozzles.

7. The jet engine noise reducing apparatus of claim 3 wherein the jet engine has an exhaust nozzle of minimum cross-sectional area A for exhaust gases carrying the noise wherein:
    a) the frequency shifting apparatus comprises a plurality of frequency shifting plates containing a plurality of small opening therethrough external to the exhaust nozzle, each of said plurality of small openings having an individual cross-sectional area which shifts frequencies of noise contained within exhaust gas passing therethrough to high frequencies; and,
    b) the first ducting mechanism comprises a plurality of first ducts in correspondence with respective ones of said plurality of frequency shifting plates, said plurality of first ducts ducting a first portion of exhaust gases from the jet engine through said plurality of frequency shifting plates.

8. The jet engine noise reducing apparatus of claim 7 wherein:
    said plurality of small openings comprises a plurality of narrow slots.

9. The jet engine noise reducing apparatus of claim 7 wherein:
    said plurality of small openings comprises a plurality of round bores.

10. The jet engine noise reducing apparatus of claim 3 wherein the jet engine has an exhaust nozzle of minimum cross-sectional area A for exhaust gases of volume V per unit of time carrying the noise wherein:
    a) the frequency shifting apparatus comprises a plurality of frequency shifting plates containing a plurality of small openings therethrough disposed external to the exhaust nozzle, each of said plurality of small openings having an individual cross-sectional area which shifts frequencies of noise contained within exhaust gases passing therethrough to higher frequencies;
    b) the first ducting mechanism comprises a plurality of first ducts in correspondence with respective ones of said plurality of frequency shifting plates said plurality of first ducts being capable of ducting said first portion of exhaust gases from the jet engine comprising a volume V/n, where n can be any number greater than zero, to said plurality of frequency shifting plates;
    c) the mixer comprises a plurality of mixing nozzles disposed within the exhaust nozzle, said mixing nozzles causing the ambient air to mix with said remaining portion of exhaust gases; and
    d) the second ducting mechanism comprises a plurality of second ducts in correspondence with respective ones of said plurality of mixing nozzles, said plurality of second ducts being capable of ducting ambient air from outside the jet engine comprising a volume V/n through said plurality of mixing nozzles.

11. The jet engine noise reducing apparatus of claim 10 wherein:
    said plurality of small openings comprises a plurality of narrow slots.

12. The jet engine noise reducing apparatus of claim 10 wherein:
    said plurality of small openings comprises a plurality of round bores.

13. The jet engine noise reducing apparatus of claim 10 wherein:

a) said plurality of frequency shifting plates are movable between a noise abating position wherein exhaust gas is ducted through said plurality of first ducts and a non-noise abating position wherein said exhaust gas is prevented from being ducted through said plurality of first ducts;

b) said plurality of mixing nozzles are movable between a noise abating position wherein ambient air from the outside of the jet engine is ducted through said plurality of mixing nozzles and a non-noise abating position wherein ambient air from the outside of the jet engine is prevented from being ducted through said plurality of mixing nozzles.

14. A method of reducing noise from a jet engine comprising the steps of:

shifting frequencies of noise contained within a first portion of exhaust gases produced by the jet engine to higher frequencies to cause an increased noise fall-off; and simultaneously mixing ambient air with a second, remaining portion of the exhaust gases to further effect noise suppression.

15. The method of claim 14 wherein the jet engine has an exhaust nozzle of minimum cross-sectional area A for exhaust gases carrying the noise and the step of shifting frequencies of noise comprises:

a) disposing a plurality of frequency shifting plates containing a plurality of small opening therethrough external to the exhaust nozzle, each of the plurality of small openings having an individual cross-sectional area which shifts frequencies of noise contained within exhaust gases passing therethrough to higher frequencies; and, b) ducting a portion of exhaust gases from the jet engine through the plurality of shifting plates.

16. The method of claim 14 wherein the jet engine has an exhaust nozzle of minimum cross-sectional area A for exhaust gases of volume V per unit of time carrying the noise and wherein the step of shifting frequencies of noise comprises:

a) disposing a plurality of frequency shifting plates containing a plurality of small openings therethrough external to the exhaust nozzle, each of the plurality of small openings having an individual cross-sectional area which shifts frequencies of noise contained within exhaust gases passing therethrough to higher frequencies;

b) disposing a plurality of mixing nozzles within the exhaust nozzle;

c) ducting a portion of exhaust gases from the jet engine comprising a volume V/n, where n can be any number greater than zero, through the plurality of frequency shifting plates; and, d) ducting ambient air from outside the jet engine comprising a volume V/n through the plurality of mixing nozzles.

17. The method of claim 14 wherein a volume of ambient air mixed with the second, remaining portion of exhaust gases substantially equals a volume of the first portion of exhaust gases undergoing frequency shifting.

* * * * *